(12) United States Patent
Ribault et al.

(10) Patent No.: US 10,569,401 B2
(45) Date of Patent: Feb. 25, 2020

(54) TENSIONING DEVICE FOR PRE-STRESSING AN ASSEMBLY WITH A THREADED ROD

(71) Applicant: Aktiebolaget SKF, Gothenburg (SE)

(72) Inventors: Patrice Ribault, Maurepas (FR); Marc Alegre, Artannes sur Indre (FR)

(73) Assignee: AKTIEBOLAGET SKF, Gothenburg (SE)

( * ) Notice: Subject to any disclaimer, the term of this patent is extended or adjusted under 35 U.S.C. 154(b) by 429 days.

(21) Appl. No.: 15/091,675

(22) Filed: Apr. 6, 2016

(65) Prior Publication Data

US 2016/0297057 A1 Oct. 13, 2016

(30) Foreign Application Priority Data

Apr. 9, 2015 (FR) ...................... 15 53039

(51) Int. Cl.
    *B25B 29/02* (2006.01)
    *B23P 19/06* (2006.01)
    *F16B 31/04* (2006.01)

(52) U.S. Cl.
    CPC ............ *B25B 29/02* (2013.01); *B23P 19/067* (2013.01); *F16B 31/043* (2013.01)

(58) Field of Classification Search
    None
    See application file for complete search history.

(56) References Cited

U.S. PATENT DOCUMENTS

| 2,571,265 A | * | 10/1951 | Leufven | ................. | B25B 29/02 |
| | | | | | 411/434 |
| 2,899,855 A | | 8/1959 | Neville et al. | | |
| 4,708,036 A | * | 11/1987 | Vossbrinck | ............. | B25B 29/02 |
| | | | | | 254/29 A |
| 4,844,418 A | | 7/1989 | Cole | | |
| 4,846,444 A | * | 7/1989 | Vassalotti | ............. | B23P 19/067 |
| | | | | | 254/29 A |
| 5,871,205 A | * | 2/1999 | Latham | .................. | B25B 29/02 |
| | | | | | 254/29 A |
| 7,658,131 B1 | | 2/2010 | Rosa et al. | | |
| 2005/0165397 A1 | * | 7/2005 | Faus | ..................... | B23P 19/067 |
| | | | | | 81/57.38 |
| 2009/0293418 A1 | * | 12/2009 | Britton | ................... | B25B 29/02 |
| | | | | | 52/745.21 |

FOREIGN PATENT DOCUMENTS

| CN | 203471727 U | 3/2014 |
| DE | 202010007013 U1 | 8/2010 |
| EP | 0695883 A1 | 2/1996 |

* cited by examiner

*Primary Examiner* — Brian D Keller
(74) *Attorney, Agent, or Firm* — Garcia-Zamor Intellectual Property Law, LLC; Ruy Garcia-Zamor; Bryan Peckjian

(57) ABSTRACT

The invention provides a tensioning device having a traction element and a body. The traction element includes a first lower portion of the traction element that resides in a tie-rod that is able to interlock with a threaded rod and a second upper portion of traction element that resides in a piston, the first and second portions of traction element being integral in displacement. The traction element is axially moveable in a bore of the body and co-axially mounted around the traction element, the body providing a first lower portion of the body that resides in a tubular support sleeve and a second upper portion of body that resides in a cylinder. An annular chamber is formed between the traction element and the body and intended to receive a pressurized fluid.

6 Claims, 3 Drawing Sheets

TENSIONING DEVICE FOR PRE-STRESSING AN ASSEMBLY WITH A THREADED ROD

CROSS-REFERENCE TO RELATED APPLICATIONS

This application claims priority to French patent application no. 1553039 filed on Apr. 9, 2015, the contents of which are fully incorporated herein by reference.

TECHNOLOGICAL FIELD

The present invention concerns a device for tensioning a rod before tightening. In particular, the invention concerns to pre-stressed threaded rods used to tighten mechanical structures together. The fields of application may concern energy, such as wind and nuclear and civil engineering.

BACKGROUND OF THE INVENTION

The tensioning devices are capable of exerting an axial tensile force to one end of a threaded rod by means of a tie-rod. The device rests on a surface of a structure to be tightened by means of a tubular support sleeve surrounding an end of the threaded rod. The device provides a cylinder and a piston sliding in the cylinder and forming with the cylinder an annular chamber dedicated to be fed with pressurized fluid.

The rod is tensioned by means of the piston pressurized and is stretched. The rod is then locked by means of a nut for example, directly on the rod or on the device itself. The released rod tends to recover its resting length but is blocked by the nut. The released rod then exerts a tightening force on the mechanical parts to tighten. Such tightening method is an advantageous alternative to tightening a nut to which an important tightening torque is to be applied.

However, such known tensioning devices are designed to be fed by a fluid under pressure up to 1,500 bar. But in some applications of reduced space, the exerted force is not enough to maintain the mechanical structures tightened together.

Furthermore, elements of the device are axially assembled but have radial overlap portions for both the retention and the sealing under fluid pressure. In some applications, the available space is greatly reduced and such devices cannot be used.

SUMMARY OF THE INVENTION

The present invention seeks to solve these problems by providing a tensioning device for a threaded rod that can exert more effort than known devices or having reduced dimensions, easy to install and use, and economic in its manufacture.

To this end, the invention concerns a tensioning device providing a traction element and a body. The traction element provides a first lower portion of traction element that consists in a tie-rod able to interlock with a threaded rod and a second upper portion of traction element that consists in a piston, the first and second portions of traction element being integral in displacement. The traction element is axially movable in a bore of the body co-axially mounted around the traction element, the body providing a first lower portion of body that consists in a tubular support sleeve and a second upper portion of body that consists in a cylinder. An annular chamber is formed between the traction element and the body and intended to receive a pressurized fluid.

According to the invention, the annular chamber is formed axially between the second portion of traction element and the second portion of body, and radially between the second portion of body and the first portion of traction element; and a first sealing means is provided radially between the second portion of body and the first portion of traction element, and a second sealing means is provided radially between the second portion of body and the second portion of traction element, so as the two sealing means are positioned axially on either side of the annular chamber to ensure its sealing. Thanks to the invention, the annular chamber intended to receive a pressurized fluid extends radially between the cylinder portion of body and the tie-rod of traction element. The radial dimension of the chamber is maximized to allow an optimization of the hydraulic surface where the fluid exerts pressure.

For a given radial dimension of the tensioning device, the effort that can be exerted is increased because of the increased hydraulic surface, beyond the usual efforts of standard devices. Such a device can thus be used in applications requiring significant tensions.

For a given effort of the tensioning device, the radial dimension of the device can be reduced. Indeed, the hydraulic surface is increased and requires a reduced surface to achieve a given force. By reducing the radial dimensions of the elements constituting the tensioning device, in particular the cylinder and the piston, the device can still exert a given effort. Such a device can thus be used in applications with reduced space.

According to further aspects of the invention which are advantageous but not compulsory, such a rod tensioning device may incorporate one or several of the following features:

The first portion of the traction element consists in a tie-rod providing an axial tubular portion provided with a central bore having an inner thread intended to cooperate with an outer thread of the threaded rod.

The second portion of traction element consists in a piston formed by a cylinder.

The traction element is formed integrally, the first and second portions of traction element being parts of a single element.

The traction element is formed by two distinct parts; the first portion of traction element consisting in a tie-rod is securely fixed in displacement by fixing means to the second portion of traction element that consists in a piston.

Fixing means between the first and second portions of traction element consists in a bore of the second portion of traction element provided with an inner thread that cooperates with an outer thread of the first portion of traction element.

The first portion of traction element consists in a support sleeve formed by a hollow axial tubular portion in which the treaded rod and the first portion of traction element are arranged and are axially movable.

The second portion of body consists in a cylinder providing a first bore in which the first portion of traction element is arranged and is axially movable, and a second bore that is coaxial with first bore and in which the second portion of traction element is arranged and is axially movable.

The body is formed integrally, the first and second portions of body being parts of a single element.

The body is formed in two distinct parts, the first portion of body consisting in a support sleeve supporting the second portion of body consisting in a cylinder.

The annular chamber is formed axially between a radial base of second portion of body and a radial flange of second portion of traction element.

The annular chamber is formed radially between the second bore of second portion of body and the axial tubular portion forming first portion of traction element.

The tensioning device provides a docking key arranged in the first portion of body and dedicated to be mounted co-axially around a nut screwed around the threaded rod, and a drive pin having one end that cooperated with the docking key and which passes through a radial opening formed in the first portion of body.

The drive pin can be manually operated or motorized.

The second portion of traction element provides an upper cylindrical end provided with an outer thread dedicated to cooperate with a nut, the nut being dedicate to come into axial abutment against the body to axially block in position the second portion of traction element.

The second portion of body provides at least one supply conduit for pressurized fluid, the conduit being connected to the annular chamber so as to be filled in with the fluid.

The traction element provides at least one supply conduit for pressurized fluid, the conduit being connected to the annular chamber. The conduit can be provided to the first and/or second portion of traction element.

The second portion of body provides means to ensure maintain of its outer periphery, for example strapping carbon tube, so as to limit radial deformation of the second portion of body under pressure.

Elements constituting the body and the traction element are made of steel, for example of type 30 CND 8 or 100C6.

The sealing means are integrated within a cavity provided in a first mechanical element so to come into contact with a second mechanical element to prevent fluid leakage and maintain pressure in the gap between the two elements.

The second portion of traction element provides a cavity provided with sealing means in sliding contact with the second portion of body.

The second portion of body provides a cavity provided with sealing means in sliding contact with the first portion of traction element.

The sealing means provide a first elastic ring mounted in the cavity of the first mechanical element and a second ring more rigid than the first ring and in sliding contact with the second mechanical element, the first elastic ring pre-stressing the second ring so to ensure contact.

The first ring of sealing means is of elastomer.

The second ring of sealing means is of plastomer.

BRIEF DESCRIPTION OF THE DRAWINGS

The invention will now be explained in correspondence with the annexed figures, as illustrative examples of a tensioning device, without restricting the object of the invention. In the annexed figures.

DETAILED DESCRIPTION OF THE INVENTION

Figure 1:
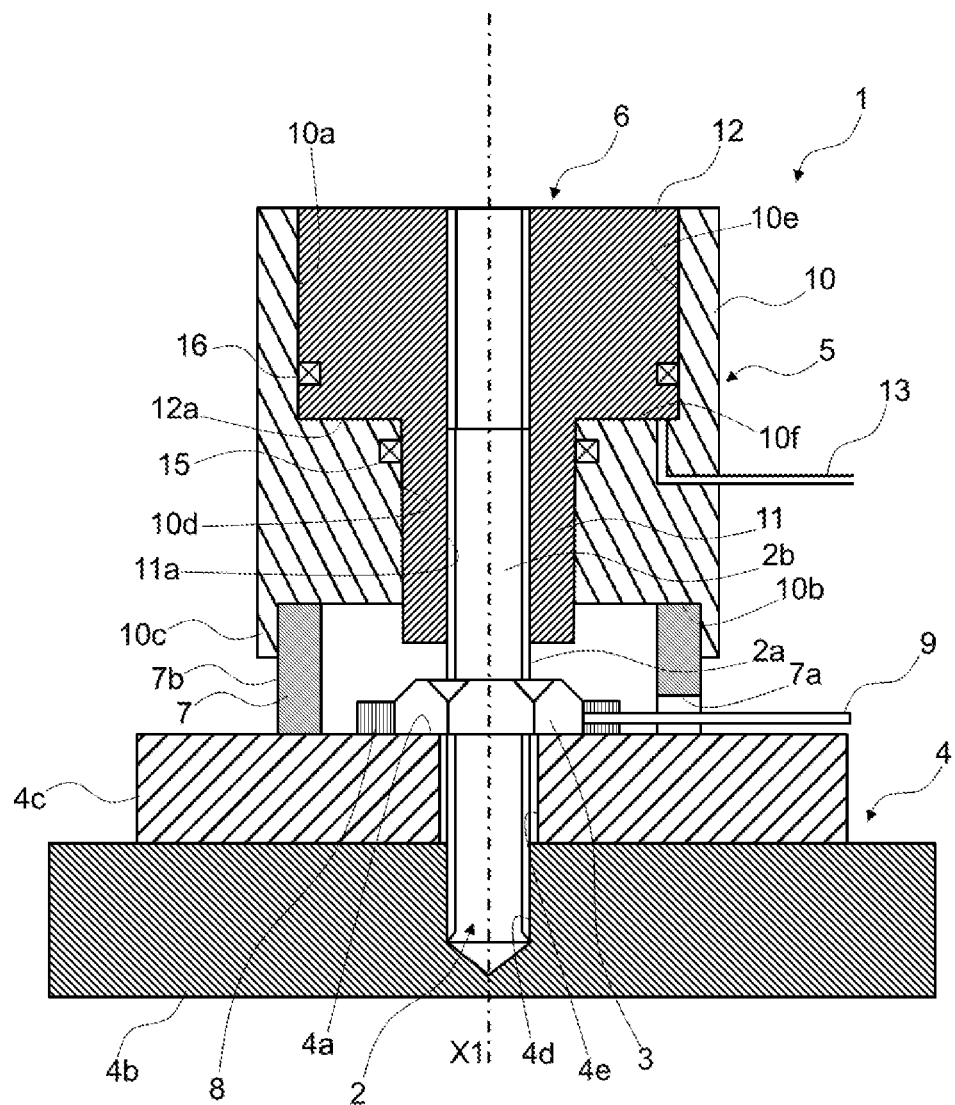
FIG. 1 is a radial sectional view of a tensioning device in a first position, according to a first embodiment of the invention.

A tensioning device, of central axis X1 and referenced 1 as a whole, is dedicated to axially tension a threaded rod 2. According to a first embodiment shown in FIGS. 1 and 1, the threaded rod 2 is then blocked by a nut 3 dedicated to bear against a surface 4a of a structure 4 usually providing at least two mechanical parts to be assembled, here represented in the form of a plate 4c and a frame 4b as an example. It is also understood that the threaded rod 2 may also consist in a screw or a bolt.

The tensioning device 1 provides a body 5 and a traction element 6.

The body 5 provides a first lower portion 7 that consists in a support sleeve formed by a hollow axial tubular portion in which the threaded rod 2 is arranged and is axially movable. A docking key is mounted co-axially around the nut 3 screwed on the threaded rod 2. A drive pin 9 can actuate the docking key at one of its ends and passes through a radial opening 7a provided to the support sleeve 7. The drive pin 9 can be manually operated or motorized.

The body 5 provides a second upper portion 10 that consists in a cylinder provided with a central bore 10a in which the traction element 6 is arranged and is axially movable. The cylinder 10 provides a support lower radial surface 10b seated on the support sleeve 7. The cylinder 10 provides a circumferential axial collar 10c forming an inner bore of corresponding shape with the outer cylindrical surface 7b of support sleeve 7. The support sleeve 7 is arranged within bore of the collar 10c of cylinder 10. The collar 10c has the function of axial guidance of the cylinder 10 mounted on the support sleeve 7 and of radial retention to prevent any radial displacement during use of the tensioning device 1.

The support sleeve 7 and the cylinder 10 forming the body 5 are two distinct parts that cooperate together. Alternatively, the support sleeve 7 and the cylinder 10 can be securely fixed together by appropriate fixing means or can be integrally formed as one and unique mechanical element.

The traction element 6 provides a first lower portion 11 that consists in a tie-rod formed by an axial tubular portion provided with a central bore 11a. The central bore 11a has an inner thread that cooperates with an outer thread 2a of the threaded rod 2. The tie-rod 11 is axially movable in a first bore portion 10d of the central bore 10a of cylinder 10. The outer cylindrical surface of tie-rod 11 has a corresponding shape with the inner cylindrical surface of the first bore portion 10d of bore 10a.

The traction element 6 provides a second upper portion 12 that consists in a piston formed by a cylindrical portion. The piston 12 is axially movable in a second bore portion 10e of the central bore 10a of cylinder 10. The outer cylindrical surface of piston 12 has a corresponding shape with the inner cylindrical surface of the second bore portion 10e of bore 10a.

The tie-rod 11 and the piston 12 forming the traction element 6 are two parts of an integral element. Alternatively, the tie-rod 11 and the piston 12 can be two distinct parts that are securely fixed by appropriate fixing means.

The outer diameter of piston 12 is strictly higher that the outer diameter of the tie-rod 11, so as to define a lower radial flange 12a of piston 12. Since the central bore 10a of cylinder 10 provides a first bore portion 10d and a second bore portion 10e of corresponding shape with the tie-rod 11 and the piston 12, respectively, a radial base 10f is defined in the cylinder 10 at junction between the first bore portion 10d and the second bore portion 10e of central bore 10a.

The cylinder 10 provides a supply conduit 13 for pressurized fluid that opens to the radial base 10f. The fluid can be oil, air or any viscoelastic fluid. As an alternate not shown, the traction element 6 can provide the supply conduit 13 that opens to the radial flange 12a.

Figure 2:
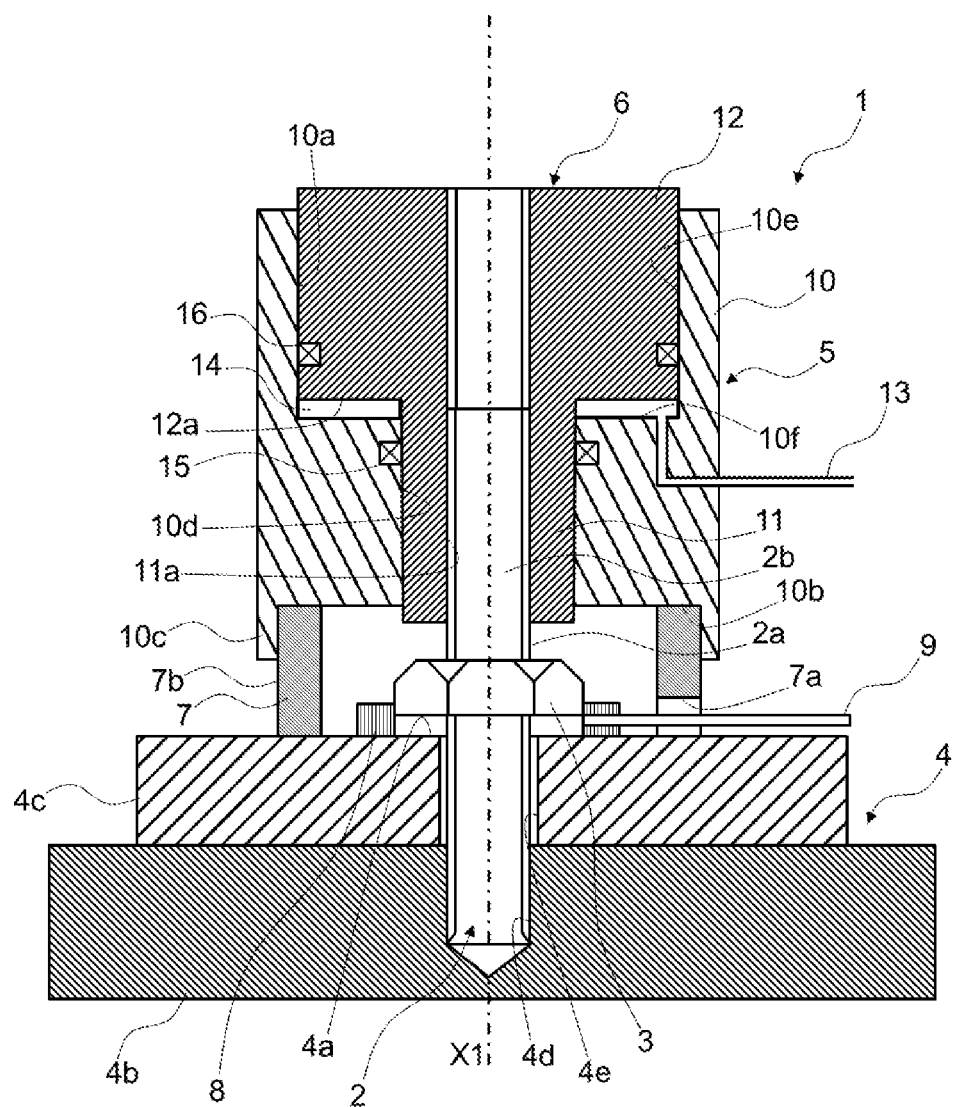
FIG. 2 is a radial sectional view of the tensioning of first embodiment in a second position.

According to the invention, and as represented in FIGS. 1 and 2 according to a first embodiment, an annular chamber 14 is formed axially between the radial base 10f of cylinder 10 and the radial flange 12a of piston 12, and radially between the second bore portion 10e of central bore 10a of cylinder 10 and the axial tubular portion that forms the tie-rod 11. This annular chamber 14 is of null initial volume, the radial flange 12a seating on radial base 10f, and is formed when pressurized fluid is supplied from conduit 13.

Moreover and according to the invention, the first bore portion 10d of central bore 10a of cylinder 10 provides an annular cavity provided with a first sealing means 15 in sliding contact with the external surface of tie-rod 11. The external surface of piston 12 provides an annular cavity provided with second sealing means 16 in sliding contact with the second bore portion 10e of central bore 10a of cylinder 10. Both sealing means 15 and 16 are axially arranged on either side of the annular chamber 14 so as to ensure the sealing of the chamber 14 when it contains pressurized fluid.

As an alternate not shown, the positions of the annular cavities 15 and 16 can be interchanged between the first bore portion 10d and the tie-rod 11 and/or the second bore portion 10e and the piston 12.

Sealing means 15, 16 can each consist in a first elastic ring, for example in elastomeric material, mounted in the cavity and a second ring in a more rigid material than the first ring, for example in plastomeric material, is in sliding contact with the mechanical element that faces it. The first elastic ring exerts a pre-stressing force onto the second ring to ensure contact.

We shall now describe the operation of the threaded rod tensioning device 2 by sequential order of steps, with FIGS. 1 and 2.

The threaded rod 2 is screwed in a threaded opening 4d provided on frame 4d.

The plate 4c is adjusted on the rod 2 until contact with frame 4b, the rod 2 passing through an opening 4e of inner diameter strictly higher than the outer diameter of rod 2.

The nut 3 is screwed on the proximal portion 2d of threaded 2 until contact with the surface 4a of plate 4c.

The tensioning device 1 is adjusted on the rod 2, so as the docking key 8 with the drive pin 9 to be positioned around nut 3, the support sleeve 7 of body 5 coming into contact with surface 4a of plate 4c around threaded rod 2 provided with nut 3. The cylinder 10 bears against the support 7. The tie-rod 11 is screwed with the proximal portion 2b of threaded rod 2. In an initial configuration illustrated in FIG. 1, the radial flange 12a of piston 12 bears against the radial base 10f of cylinder 10. The threaded rod 2 is not stressed by any axial force and has a proximal portion 2d dedicated to be stretched.

As illustrated in FIG. 2, a pressurized fluid is supplied in the conduit 13 of cylinder 10 between the radial base 10f and the radial flange 12a of piston 12. Thanks to the sealing means 15 and 16, the piston 12 moves away from the radial base 10f of cylinder 10 and raises the tie-rod 11. The annular chamber 14 is formed between the traction element and the body 5 of tensioning device 1. The axial force is exerted on the material of the threaded rod and causes an increase in the length of rod 2.

The nut 3 is axially removed from the support surface 4a of plate 4. Once the desired tension is applied to the rod 2, the drive pin 9 actuates the docking key to screw the nut 3 until contact with the surface 4a of plate 4.

The hydraulic pressure is released and the tie-rod 11 unscrewed from the threaded rod 2. The nut 3 bearing against the structure 4, the threaded rod 2 remains stretched. The device 1 is then removed.

Thanks to the invention, the hydraulic radial surface on which the fluid exerts a pressure is maximum between the second bore portion 10e or central bore 10a of cylinder 10, ie. the bore portion of larger inner diameter, and the outer surface of tie-rod 11, ie. the portion of traction element 6 of smaller outer diameter.

For a given radial dimension of device 1, and in particular the given radial dimensions of piston 12 and cylinder 10, it is possible to exert a much higher tension.

Moreover, for a given tension to apply, it is possible to reduce the radial size of device 1, by reducing the radial size of the annular chamber 14 sufficiently to exert the desired tension.

Figure 3:
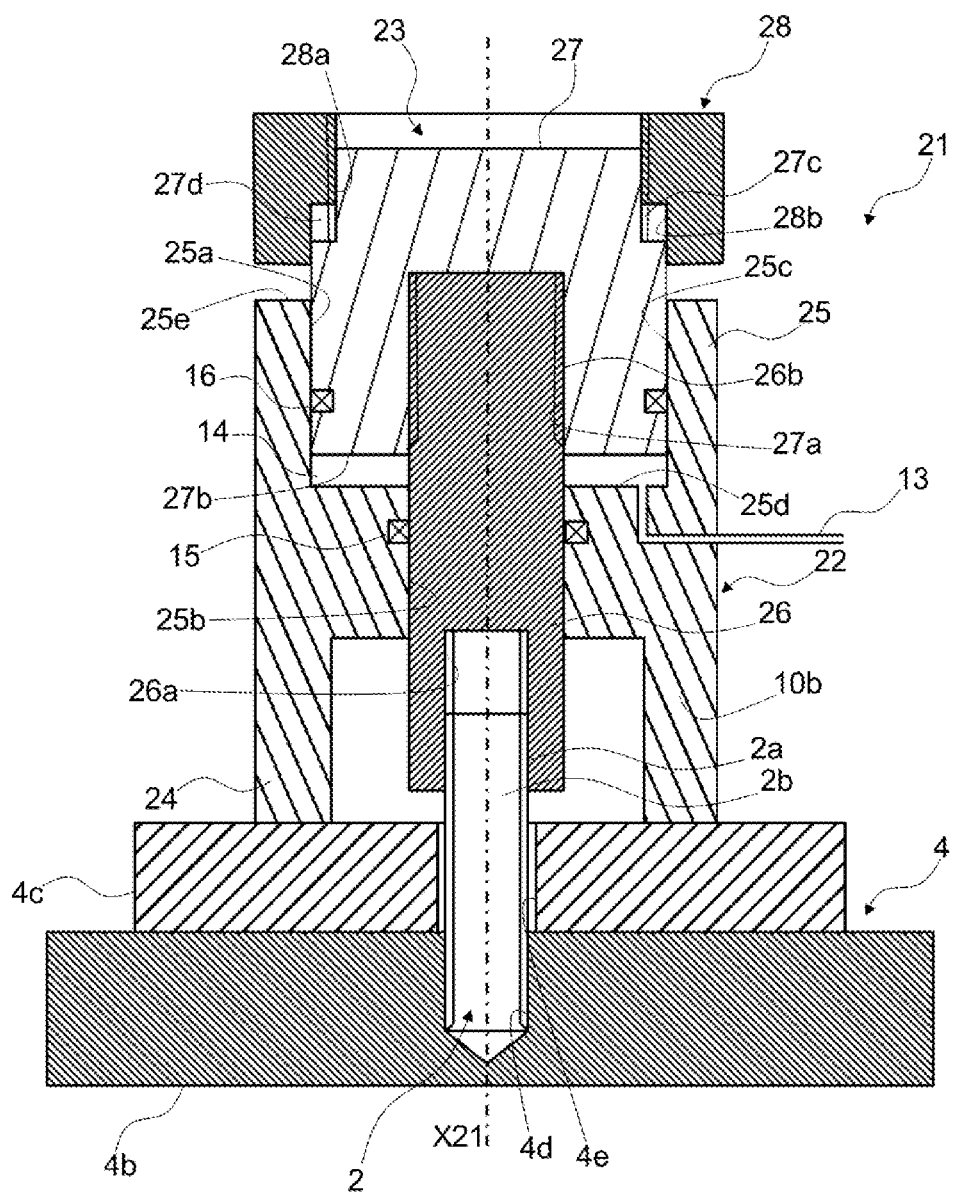
FIG. 3 is a radial sectional view of a tensioning device, according to a second embodiment of the invention.

A second embodiment of the present invention is illustrated in FIG. 3 and differs from the first embodiment illustrated in FIGS. 1 and 2 in that a tensioning device 21, of central axis X21, consists in a hydraulic nut.

The tensioning device 1 described in the first embodiment consists in a tensioner, an apparatus to be used and reused for tensioning a plurality of threaded rods. The device 21 to be described in this second embodiment consists in a hydraulic nut, which acts both as a tensioner and a nut. The device 21 permanently remains on structure 4.

In the following description, similar elements between FIGS. 1 to 3 keep the same references.

The tensioning device 21 provides a body 22 and a traction element 23.

The body 22 provides a first lower portion 24 that consists in a support sleeve formed by a hollow axial tubular portion in which the threaded rod 2 is arranged and is axially movable.

The body 22 provides a second upper portion 25 that consists in a cylinder provided with a central bore 25a in which the traction element 23 is arranged and is axially movable.

The support sleeve 24 and the cylinder 25 forms the body 5 in one integral mechanical element. Alternatively, the support sleeve 24 and the cylinder 25 can be two distinct parts cooperating and/or securely fixed by appropriate fixation means.

The traction element 23 provides a first lower portion 26 that consists in a tie-rod formed by an axial tubular portion provided with a central bore 25a. The bore 25a provides an inner thread that cooperates with an outer thread 2a of threaded rod 2. The tie-rod 26 is axially movable in a first bore portion 25b of central bore 25a of cylinder 25. The outer cylindrical surface of tie-rod 26 has a corresponding shape with the inner cylindrical surface of the first bore portion 25b of bore 25a.

The traction element 23 provides a second upper portion 27 that consists in a piston formed by a cylindrical part. Piston 27 is axially movable in a second bore portion 25c of central bore 25a of cylinder 25. The outer cylindrical surface of piston 27 has a corresponding shape with the inner cylindrical surface of the second bore portion 25c of bore 25a.

The outer diameter of cylinder 27 is strictly higher that the outer diameter of tie-rod 26, so as to define a lower radial flange 27b of piston 27. Since the central bore 25a of cylinder 25 provides a first bore portion 25b and a second portion 25c of corresponding shape with the tie-rod 26 and the piston 27, respectively, a radial base 25d is defined at junction of the first bore portion 25a and second bore portion 25c of central bore 25a.

The tie-rod 26 and the piston 27 forming the traction 23 are two distinct elements and are securely fixed by appropriate fixing means. In the example illustrated in FIG. 3, the piston 27 provides a threaded bore 27a that cooperates with a threaded portion 26b of an end of tie-rod 26. A traction element 26 made of two distinct part 26, 27 gives advantage when the threaded rod 2 to be tensioned has an outer diameter strictly greater than the inner diameter of the first bore portion 25a. Indeed, in such a case, the free end of tie-rod 26 has a radial dimension adapted to interlock with the threaded rod 2 and is thus strictly greater than the inner diameter of the first bore portion 25a.

Alternatively, the tie-rod 11 and the piston 12 are two parts of an integrally formed traction element.

The cylinder 25 provides a conduit 13 to be supplied by pressurized fluid, the conduit 13 being opened to the radial base 25d.

An annular chamber 14 is formed axially between the radial base 25d of cylinder 25 and the radial flange 27b of piston 27, and radially between the second bore portion 25c of central bore 25a of cylinder 25 and the axial tubular portion forming the tie-rod 26. This annular chamber 14 is of null initial volume, the radial flange 27b seating on radial base 25d, and is formed when pressurized fluid is supplied from conduit 13.

Moreover, the first bore portion 25b of bore 25a of cylinder 25 provides an annular cavity provided with first sealing means 15 in sliding contact with the outer surface of tie-rod 26. The outer surface of piston 27 provides an annular cavity provided with second sealing means 16 in sliding contact with the second bore portion 25c of bore 25a. Both sealing means 15 and 16 are axially arranged on either side of the annular chamber 14 to ensure sealing and prevent leakage of pressurized fluid.

A nut 28 is screwed on an outer thread 27c provided at an upper end 27d of piston 27. The upper end 27d of piston 27 has an outer diameter strictly lower than the diameter of the piston body arranged in the bore 25c of cylinder 25. The nut 28 provides a central bore provided with a first bore portion 28a of lower diameter equal to the diameter of the upper end 27d, the portion 28a having a thread cooperating with the thread 27c of the end 27d. The bore of nut 28 provides a second bore portion 28b that is cylindrical and of inner diameter equal to the outer diameter of the piston body arranged in the bore 25c of cylinder 25.

The operation of the hydraulic nut 21 is similar to the tensioner 1, differing only in that the nut 28 is screwed on the piston 27 until abutment with a supper flange 25e of an upper end of cylinder 25, after the threaded rod 2 is tensioned and stretched. The hydraulic pressure is then released. The nut 28 bears against the cylinder 25 and then the piston 27 and the tie-rod 26 remain in position and maintain stretched the threaded rod 2. The device 21 permanently remains in position to ensure tightening of structure 4.

The technical features of the embodiments and alternatives as discussed above may be combined.

The invention claimed is:

1. A tensioning device comprising:
a traction element, and
a body, wherein
(a) the traction element provides a first traction element lower portion that includes a tie-rod able to interlock with a threaded rod located along a central axis of the tensioning device, and a second traction element upper portion that includes a radial flange forming a shoulder between the first traction element lower portion and a piston extending axially therefrom, the first traction element lower portion and the second traction element upper portion being a single, one-piece member, the first traction element lower portion and the second traction element upper portion being integral in displacement;
(b) the traction element is axially movable in a bore of the body mounted co-axially around the traction element, a first body lower portion that includes a support tubular sleeve having an outer cylindrical surface facing radially outwardly from the central axis, and a second body upper portion that includes a cylinder and a radial base extending inwardly therefrom, wherein the second body upper portion includes a circumferential axial collar which extends from the second body upper portion to form a second bore, the support tubular sleeve being located inside the second bore such that the circumferential axial collar overlies a portion of the support tubular sleeve; and
(c) an annular chamber is formed between the traction element and the body and is intended to receive a pressurized fluid;
(d) the annular chamber is formed axially between the radial base of the second body upper portion and the radial flange of the second traction element upper portion and radially between the cylinder of the second body upper portion and the first traction element lower portion; and wherein
(e) the device provides a first sealing means mounted radially between the second body upper portion and the first traction element lower portion, and a second sealing means mounted radially between the second body upper portion and the second traction element upper portion, the two sealing means being positioned axially on either side of the annular chamber to ensure sealing of the annular chamber, wherein when the radial flange is in contact with the radial base, the piston is adjacent to the cylinder with no component therebetween except for one of the two sealing means, the traction element being configured such that: (1) the shoulder of the second traction element upper portion is positionable against the radial base of the second body upper portion of the body, (2) an outer surface of the second traction element upper portion is positioned adjacent to and opposingly facing an inner surface of the bore of the second body upper portion, and (3) the second traction element upper portion and the first traction element lower portion define a threaded bore to threadably engage the threaded rod.

2. The device according to claim 1, wherein the bore comprises a first bore portion and a second bore portion, the second bore portion co-axial to the first bore portion, wherein the first traction element lower portion is disposed within the first bore portion and is axially movable, and the second traction element upper portion is disposed within the second bore portion and is axially movable.

3. The device according to claim 2, wherein the annular chamber is formed radially between the second bore portion and the first traction element lower portion.

4. The device according to claim 1, wherein the tensioning device provides a docking key disposed within the first body lower portion and co-axially mounted around a nut screwed on the threaded rod, and a drive pin having an end that cooperates with the docking key and passes through a radial opening provided in the first body lower portion.

5. The device according to claim 1, wherein the second body upper portion provides at least one conduit to be supplied by the pressurized fluid and connected to the annular chamber.

6. The device according to claim 1, wherein the first sealing means and the second sealing means are each separately arranged within a respective cavity provided on one of the body and the traction element to come in sliding contact with the other of the body and the traction element to prevent leakage of the pressurized fluid and maintain the pressure between the body and the traction element.

* * * * *